(12) United States Patent
Edwards

(10) Patent No.: US 7,485,071 B2
(45) Date of Patent: Feb. 3, 2009

(54) FABRIC YOGA STRAPS

(76) Inventor: Richard Edwards, 7825 Michigan Ave., Oakland, CA (US) 94605

( * ) Notice: Subject to any disclaimer, the term of this patent is extended or adjusted under 35 U.S.C. 154(b) by 0 days.

(21) Appl. No.: 11/544,292

(22) Filed: Oct. 6, 2006

(65) Prior Publication Data

US 2007/0066467 A1  Mar. 22, 2007

Related U.S. Application Data

(63) Continuation-in-part of application No. 11/036,969, filed on Jan. 14, 2005, now abandoned.

(60) Provisional application No. 60/536,857, filed on Jan. 15, 2004.

(51) Int. Cl.
*A63B 26/00* (2006.01)
(52) U.S. Cl. .......................................... 482/23; 482/907
(58) Field of Classification Search ............. 482/23–29, 482/140
See application file for complete search history.

(56) References Cited

U.S. PATENT DOCUMENTS

| | | | | |
|---|---|---|---|---|
| 4,822,669 A * | 4/1989 | Roga | ........................... | 442/373 |
| 4,905,990 A * | 3/1990 | DeSantis | ...................... | 482/23 |
| 5,060,943 A * | 10/1991 | Stoffo | ......................... | 401/195 |
| 5,467,484 A * | 11/1995 | Drescher et al. | ............. | 2/161.8 |
| 5,643,653 A * | 7/1997 | Griesbach et al. | ........... | 428/120 |
| 6,276,828 B1 * | 8/2001 | Otley et al. | ...................... | 383/4 |
| 6,368,255 B1 * | 4/2002 | Chan-Rouse | ................. | 482/91 |
| 6,387,013 B1 * | 5/2002 | Marquez | ...................... | 482/23 |
| 6,468,646 B2 * | 10/2002 | Carson et al. | ............. | 428/315.9 |
| 6,562,271 B2 * | 5/2003 | Hiraoka et al. | ............... | 264/257 |
| 6,849,055 B1 * | 2/2005 | Williams | ..................... | 601/137 |
| 6,961,969 B2 * | 11/2005 | Nichols | ......................... | 5/420 |
| 7,007,322 B2 * | 3/2006 | Alane | ............................. | 5/417 |
| 2001/0034288 A1 * | 10/2001 | Howlett-Campanella | ..... | 482/23 |
| 2002/0096919 A1 * | 7/2002 | Sparks | .................. | 297/228.12 |
| 2004/0250346 A1 * | 12/2004 | Vasishth | ......................... | 5/417 |

FOREIGN PATENT DOCUMENTS

WO  WO 03/18139 A1  3/2003

* cited by examiner

*Primary Examiner*—Lori Amerson
(74) *Attorney, Agent, or Firm*—Quine Intellectual Property Law Group; Gary Baker

(57) ABSTRACT

Composite yoga mats and straps comprising a fabric sheet and loop holes and/or filament loops functioning as hand grips or appendage supports useful in the practice of yoga positions. The yoga straps or mats can to provide support, a stable surface, and moisture absorption for the practice of yoga.

20 Claims, 5 Drawing Sheets

FABRIC YOGA STRAPS

CROSS-REFERENCE TO PRIOR APPLICATIONS

This application is a Continuation in Part from U.S. patent application Ser. No. 11/036,969, Composite Yoga Mats, by Richard Edwards, filed Jan. 14, 2005, which claimed priority to and benefit of a prior U.S. provisional application No. 60/536,857, Composite Yoga Mats by Richard Edwards, filed Jan. 15, 2004. The full disclosure of this prior application is incorporated herein by reference.

FIELD OF THE INVENTION

The present invention is in the field of accessories for the practice of yoga. In particular, the invention provides, e.g., multifunctional fabric yoga straps and composite yoga mats that provide support, comfort, and stability for practitioners practicing various yoga positions.

BACKGROUND OF THE INVENTION

Many yoga positions and forms of yoga practice can be performed on a floor without any special implements. Yoga has been traditionally practiced with the practitioner changing positions on a mat, such as a tatami mat. However, traditional mats are not portable and many modern mats are uncomfortable and slippery when wet. Yoga practitioners have been known to use loops of strapping to help hold an appendage in a desired position. Current yoga mats and accessories fail to provide features ergonomic and efficient for the practice of yoga, such as personal surfaces, cushioning, sweat absorption, comfortable and dry gripping, aid in attaining positions, compactness, a stable foundation, and/or positional reference frames.

Yoga practitioners typically arrive at group practice with personal yoga mats. These mats can stake out a location on the floor for the individual, provide some cushioning, and provide a personal contact surface for each practitioner. However, these mats can be unstable, slippery, unhygienic, and provide few functional benefits beyond presentation of a homogenous padded surface.

One common type of yoga mat is a sheet of polyvinyl foam. The sheet is unrolled on the floor to serve as a yoga mat. However, as yoga can be strenuous the mat can become contaminated with sweat. This can be particularly troublesome for practitioners of bikram yoga, wherein the exercises are practiced in hot environments. Sweat can accumulate on the hydrophobic mats making them slippery, uncomfortable, and unhygienic.

Another problem with typical yoga mats is their lack of stability. During dynamic transitions between yoga positions, supporting body parts can slip on the mat or the mat can slip across the floor. This problem can make practice of some positions difficult of hazardous.

During the learning process, or in the practice of difficult positions, there can be a need for an extended reach or additional support. Yoga practitioners can use looped cords, such as those described in international publication number WO 03/018139, Method and Apparatus for Performing Stretching Exercises, by Flynn; or, U.S. Pat. No. 6,368,255, Device for Stretching and Yoga, to Chan-Rouse. However, these yoga straps provide only the support function and can have slippery, uncomfortable grips. There are only so many yoga implements practitioners can carry. A clutter of devices in the practice room can disturb the serenity of the traditional yoga environment.

In view of the above, a need exists for a yoga mat that provides a combination of moisture absorbance, comfort, and stability. It would be desirable to have yoga straps and mats that contribute multiple benefits beyond only cushioning the surface or providing crude support. Benefits could be derived from yoga mats and straps tailored to unique combinations of yoga practitioner needs. It could be useful to have yoga straps that can provide other functions associated with yoga. The present invention provides these and other features that will be apparent upon review of the following.

SUMMARY OF THE INVENTION

Composite yoga mats and straps of the invention can provide unique combinations of practical functions not available from traditional yoga mats. Yoga mats and straps of the invention can absorb moisture, control transfer of moisture, provide a more sure grip, provide cushioning, insulate, provide stability, present functional information, be lightweight and portable, and/or the like. Yoga mats of the invention generally comprise, e.g., a moisture absorbent fabric sheet having a moisture absorbent first side surface, and a frictional material disposed on the fabric sheet second side to provide cushioning and a stable yoga practice surface. Yoga straps of the invention can provide a dry and padded sheet while also being useful for supporting practitioners in yoga positions or for binding and carrying other yoga equipment. Yoga mats can have loops and function as a strap; yoga straps can have fabric sheets with properties of yoga mats.

Yoga straps of the invention can aid a practitioner of yoga in a variety of yoga positions. For example, they can provide a tensile connection between two appendages, capable of resisting tension of 50 pounds or more, thus allowing the practitioner to hold a position for a longer period of time and/or at a greater extent of joint motion than could be accomplished by the practitioner without the aid of the yoga strap. A typical yoga strap can include a fabric sheet having a first pair of opposite peripheral edges, a second pair of opposite peripheral edges, a first face, and a second face. A flexible filament can be attached to the first pair of opposite (usually longer) peripheral edges, and form a first loop extending beyond one of the second (usually shorter) peripheral edges and form a second loop extending beyond the other of the second peripheral edges. Typically, the fabric sheet is substantially rectangular and the flexible filament is attached, e.g., to reinforce the first pair of opposite edges while looping out from the second pair of opposite edges.

The fabric sheet is preferably flexible, soft, strong and absorbent. For example, the fabric sheet can be formed from terry cloth, chamois, synthetic chamois, fibers with a hydrophilic coating, a combination of absorbent and nonabsorbent fibers, plant fibers, cotton and/or the like. The fabric sheet typically is longer along the pair of parallel edges reinforced with the flexible filament and shorter along the parallel peripheral edges the flexible filament extends out from to form hand grip loops (extension loops). For example, in preferred embodiments, the fabric sheet has a width less than about 18 inches and a length less than about 4 feet thereby providing a structure with dimensions functional as a yoga strap. In preferred embodiments, the fabric sheet has a length and width more than 12 inches and the flexible filament is not substantially elastic. In preferred embodiments, the fabric sheet is surrounded with the flexible filament (although not attached along the entire periphery) and has no substantial other materials attached to any peripheral edge, e.g., it is preferred that the sheet (and strap as a whole) be without a second larger fabric sheet (e.g., a full-sized mat) attached to any of the peripheral edges, or at least be readily detachable from such a sheet.

The flexible filament can be in contact with the fabric sheet on at least two peripheral edge segments or sides, thus capable of supporting at least some part of the sheet in a planar orientation when appropriately directed tension is applied to the filament loops. In preferred embodiments, the flexible filament contacts, and is attached to the fabric sheet on at least two separate (preferably symmetrical, parallel and/or opposite) positions along the sheet peripheral edge. The flexible filament can be attached to the fabric sheet peripheral edge, e.g., by stitching at or near the edge of the sheet, captured in a fold (e.g., sewn into an hem) of the sheet, glued to the sheet, or the filament can be in the form of a thickened portion of the sheet peripheral edge (or not). In many cases the flexible filament is a belt, strap or rope sewn into the edge of the sheet. The flexible filament is usually the structure of the yoga strap most responsible for the function of providing tensile strength necessary to support yoga practitioners in the practice of yoga. In preferred embodiments, the flexible filament, when held from a loop at one end, can support a weight of more than 75 pounds, more than 100 pounds, more than 200 pounds, more than 300 pounds or preferably more than 500 pounds from a loop at the other end of the yoga strap, without breaking. The flexible filament can form extending loops where it leaves contact with the fabric sheet peripheral edge. Extending loops of flexible filament can include a loop circumference comprising the extended filament and unattached fabric sheet peripheral edge between or can be exclusively formed from extended filament. The internal circumference of extending loops (including any peripheral edge between) can be about 4 inches, 6 inches, 8 inches, 12 inches, 24 inches, 30 inches or more, to provide a structure capable of allowing entry and/or functioning as a grip for a hand, a foot grip, a leg grip, or a waist. The flexible filament of the extending loops is preferably continuous from the first loop to the second loop; more preferably, continuous from the first loop to the second and back to form an entire continuous strap with any filament end connection(s) being at least as strong as the filament itself.

The present invention further includes embodiments wherein the yoga strap or mat is structured to function in packaging and/or holding and carrying other objects used in the routine practice of yoga. For example, the mat or strap can be wrapped around a rolled up yoga mat, thus keeping it from unrolling and, e.g., providing convenient carry handles. In some embodiments, the strap or mat can be passed around the yoga object and back through a loop or hole in the mat or strap to form a snare that captures and/or compresses the object for carrying or storage. In embodiments where a yoga strap fabric sheet has externally curving peripheral edges, tension on the filaments can form a pouch in the fabric sheet capable of holding objects. In other embodiments the peripheral edges are straight where the flexible filament is attached so a pouch is not formed when the filament is under tension.

The present invention includes methods of practicing yoga positions with support from a yoga strap of the invention. For example, with one loop in one hand, and with a foot passed through an opposing loop, from a standing position the hand can support and lift the foot forward, sideward or behind the practitioner, e.g., in the natarajasana, vrksasana, or chandrasana positions. Optionally, one practitioner (e.g., a teacher) can support the waist of a second practitioner (e.g., a student) with the fabric sheet around the waist and opposing loop in the hands, e.g., to support the second practitioner through transitions between positions or to reduce the stress of a position (e.g., a bridge, headstand, scorpion, etc.).

The moisture absorbent fabric sheet of the yoga mats (or fabric sheets of yoga straps) can include shapes and materials suitable for particular intended uses within the field of yoga practice. The strength and absorbency of yoga mats can be influenced by the choice of materials. The yoga mats can be manufactured from, e.g., terry cloth, chamois, synthetic chamois, hydrophilic fibers, fibers with a hydrophilic coating, a combination of absorbent and nonabsorbent fibers, microfibers, nanofibers, fibers embedded with a rubber, plant fibers, cellulose, polyester, hemp, cotton, paper, and/or the like. More absorbent materials can be preferred in high moisture yoga environments, while stronger or more cushioned materials can be preferred for more dynamic aerobic forms of yoga. Yoga mats of the invention can have a fabric sheet width, e.g., less than about 3 or 4 feet and a length less than about 6 or 7 feet; larger sizes can provide bigger practice surfaces, or narrower dimensions can be well suited for yoga mats focusing on strap/loop support utilities. The yoga mat or strap fabric sheet can have a reinforced peripheral edge to provide strength and wear resistance. Yoga mats or straps of the invention can have, e.g., fabric sheets with two or more opposing loop holes adjacent to the peripheral edge or extending filament loops with holes large enough to make a constriction loop by insertion of the other end of the mat or strap, or large enough to insert fingers, hands, feet, etc., for support in particular yoga positions. The loop holes often have an internal circumference more than about 6 inches.

In one embodiment, yoga mats or straps of the invention are configured to support yoga practitioners in strenuous or difficult positions. For example, a yoga mat can be provided with dimensions and loop holes well adapted for use in a functional yoga strap configuration. The fabric sheet can have, e.g., two or more opposing loop holes with an internal circumference of more than about 6 inches adjacent to a reinforced peripheral edge so that yoga positions can be learned or practiced by insertion of body appendages into the loop holes or constrictable loops formed with the mat. Loop holes can be made more strong and wear resistant by reinforcing the internal circumference. In one embodiment, a yoga mat can act as a support strap, with a fabric sheet having a first face, a second face, and a peripheral edge; the fabric sheet having two or more opposing loop holes adjacent and internal to the peripheral edge, the loop holes comprising an internal circumference of more than about 6 inches so that a variety of yoga positions can be practiced by insertion of yoga practitioner body appendages into the loop holes or constrictable loops formed by pulling the bulk of the strap through a hole and capturing an appendage of the yoga practitioner. Yoga mats configured for use in support functions typically have narrow dimensions with loop holes on the ends. For example, the yoga mats can have a length more than about 3 feet (to function in support of a large variety of yoga poses) while the width is about 18 inches, 12 inches, 6 inches, or less. Intermediate loop holes in fabric sheets can be included to provide a range of possible support locations on a mat or strap for choice of constrictable loop sizes.

The frictional material of the yoga mats can be disposed on the absorbent fabric to provide, e.g., slippage prevention, blockage of moisture transfer, cushioning, ornamental designs, instructional indicia, etc. The frictional material can comprises rubber, foam rubber, resilient polymers, polyvinyl foam, sponge, cork, silicone rubber, and/or the like. Frictional material can be disposed on the fabric in a continuous surface, a textured surface, as informative indicia, as a pattern, as a layer, interwoven with the fabric, and/or the like. Frictional material can be disposed on both sides of a fabric sheet, e.g., to provide a non-slip or decorative function on both sides of the fabric sheet. Frictional material ornamental patterns or indicia are preferred on the first side, facing the yoga practitioner. Frictional material can be absent from the first side or comprise, e.g., about 20% to about 60% of the first side.

Yoga mats and straps of the invention can include connectors to stabilize desired configurations or to connect two or more of the devices. For example, connectors can be provided to maintain a rolled configuration, bind two or more mats and/or straps together, or to fix a constrictable loop in a desired position.

The present invention includes methods of practicing yoga using the composite yoga mats of the invention. The unique combination of features provided by the yoga mats of the invention allows, e.g., practice of yoga in an environment unavailable with traditional mats. Composite yoga mats and yoga straps can provide a stable, dry location for yoga exercises, loop supports for difficult positions, and the ability to expand or thicken the practice surface.

DEFINITIONS

Before describing the present invention in detail, it is to be understood that this invention is not limited to particular devices or combinations of materials, which can, of course, vary. It is also to be understood that the terminology used herein is for the purpose of describing particular embodiments only, and is not intended to be limiting. As used in this specification and the appended claims, the singular forms "a", "an" and "the" can include plural referents unless the content clearly dictates otherwise. Thus, for example, reference to "a frictional material" can include a combination of two or more frictional materials; reference to "fabric" can include mixtures of fabrics, and the like.

Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

As used herein, a "yoga strap" refers to a functionally continuous closed loop of a flexible filament which is attached at two or more separated positions to the peripheral edge of a fabric sheet.

A "peripheral edge", as used herein, refers to the external boundary of a fabric sheet of the invention. The edge can include a fold or hem formed at the edge; optionally, capturing a length of flexible filament. The peripheral edge, with regard to attachment of the filament can include the outer edge and/or some of the fabric surface immediately adjacent to the edge, e.g., within 2 inches, 1 inch 0.5 inches, as necessary to the dimensions of the filament and choice of attachment means. The peripheral edge of a fabric sheet in the invention is typically strengthened with reinforcement and/or by incorporation of a flexible filament at one or more location (section) along the peripheral edge. The fabric sheet incorporated into the yoga mats or yoga straps is flexible and it is preferred that the sheet can be laid out flat with the peripheral edges extended outward in a plane without substantial amounts of excess loose material outside the plane of the edges. In preferred embodiments, the fabric sheet of a yoga strap can be laid out flat with the peripheral edges extended outward in a plane with excess loose material capable of extending away from the plane not more than 1 inch, not more than 2 inches, not more than 3 inches, or not more than 5 inches.

A "loop extending beyond" the peripheral edge includes a section of a flexible filament not in contact with the fabric sheet. A "loop hole" is a hole in a fabric sheet and/or internally adjacent to the peripheral edge of a fabric sheet.

A "yoga practitioner" is a person practicing exercises of the body which are part of the exercises or positions included in a system of yoga teachings, such as hatha yoga, raja (ashtanga) yoga, bhakti yoga, jnana yoga, kriya yoga, karma yoga, bikram yoga, and the like. A person is practicing yoga using the devices of the invention when the person is using the structure of the device (mat and/or strap) as an aid in attaining or maintaining a yoga position (for the person or a second person), or transitioning between yoga positions (poses).

The term "Composite yoga mat" or yoga mat of the invention, as used herein, refers to a yoga mat fabricated from two or more different materials, or two or more structural elements, to provide functions adapted to the practice of yoga. For example, composite yoga mats can be fabricated with a combination of a moisture absorbent material and a frictional material. A composite yoga mat can be fabricated to include various structural elements including combinations of loop holes for gripping and supporting, frictional surfaces to prevent slipping, reinforced edges to add strength and comfort, patterns and/or indicia to provide positioning references and an attractive appearance, connectors to maintain a compact roll or bind multiple mats together, long thin mats to function as pads and straps, large wide mats to provide an adequate defined yoga practice surface, and/or the like.

The term "moisture absorbent", as used herein, refers to material that has an affinity for water (hydrophilic). Moisture absorbent fabric sheets can include, e.g., materials that draw moisture away from yoga practitioners and/or frictional materials of the invention.

The term "frictional material", as used herein, refers to materials disposed on fabric sheets of the invention to provide reduced slippage between the yoga mat and the yoga practitioner or the floor. Frictional materials can include, e.g., materials with a coefficient of friction greater than that of the fabric sheet. Frictional materials can include, e.g., materials with a coefficient of static or kinetic friction greater than about 0.6 in contact with typical surfaces encountered in yoga practice. Typical frictional materials of the invention include, e.g., rubber, foam rubber, resilient polymers, polyvinyl foam, sponge, cork, silicone rubber, and the like. Frictional materials can also contribute other characteristics to the composite mats of the invention, such as, e.g., cushioning, absorbency, ornamental designs, toughness, and the like.

The term "loop holes", as used herein, refers to holes running through a yoga mat or yoga strap fabric sheet of the invention with a location and size appropriate for formation of constrictable loops, gripping with hands or feet, and/or for insertion of appendages for support during yoga exercises.

DETAILED DESCRIPTION

Yoga straps of the invention provide a unique combination of a supporting strap (flexible filament) surrounding and extending beyond a fabric sheet. The flexible filament of sturdy material forms a continuous flexible ring that can be used to support the body weight of a yoga practitioner and/or support one or more appendages of the practitioner during the practice of physical yoga exercises. The fabric sheet can provide multiple functions, such as, e.g., to provide a broad contact area to support practitioner body parts, moisture absorbance, a comfortable grip material, a hand sized grip material, a broad surface for use in bundling other yoga equipment, and/or the like. The combination of the flexible filament and fabric sheet provides multiple benefits to the yoga practitioner in a small package. The yoga strap of the invention can incorporate aspects of yoga mats described herein.

Figures 5A, 5B:
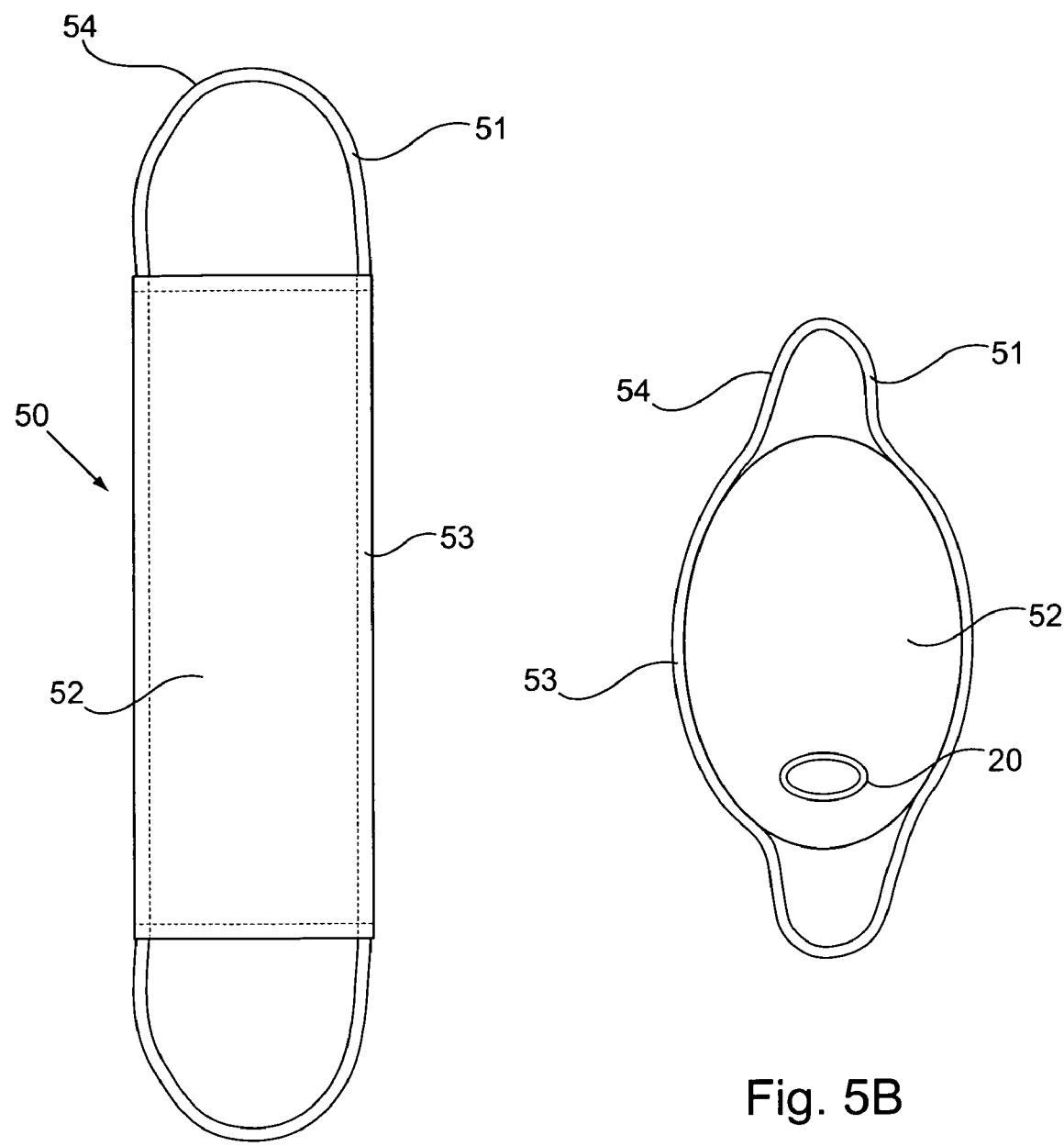
FIGS. 5A and 5B show schematic diagrams of yoga straps including a fabric sheet attached to a flexible filament continuous ring and a yoga strap with curved peripheral edge sections for filament attachment and having an intermediate loop hole.

For example, a yoga strap 50 can include a flexible filament 51 and a fabric sheet 52 (as shown in FIG. 5). The flexible filament can be attached to the fabric sheet at, e.g., the peripheral edge 53 (defining the outer extent of the sheet) at two or more peripheral edge sections. The flexible filament can be unattached, e.g., at two or more locations to form loops 54 extending from the fabric sheet. In a typical use, a practitioner can place an ankle into a first loop and hold a second loop (or the bundled fabric sheet) in her hand to support the ankle (and associated leg) in a position appropriate to a desired yoga position (such as, e.g., a natarajasana). Here, the yoga strap of the invention provides a stronger, dryer grip better formed to the shape of a hand grip and providing a more sure grip than plain straps of the old art. In another typical use, a yoga teacher can help support a yoga practitioner student in a setu bandhasana (bridge pose) by placing the yoga strap around the practitioner's waist while the teacher holds up loops at each end of the strap. Here, the yoga strap of the invention provides a broader, dryer, softer support, with lower contact pressures on the practitioner than old art straps.

Composite yoga mats of the invention can be fabricated from two or more materials, e.g., adapted to provide two or more characteristics particularly tailored to the needs of yoga practitioners. The environment for practice of yoga can require, e.g., a well defined space, maintenance of dry surfaces, provision of reach and support for some positions, stable surfaces for dynamic motions, and comfortable contact surfaces. Yoga mats of the invention provide a unique combination of features, such as, e.g., a moisture absorbent base fabric for contact with the practitioner, a friction material to provide a stable yoga platform, informative indicia, and/or perforations to support body appendages in new or difficult positions.

In one embodiment, for example, the yoga mat of the invention can be an absorbent terrycloth sheet embedded on one side with a flexible foam rubber coating of frictional material, and having loop-hole perforations at opposite ends useful in looping support for arms and legs. The yoga mat can be placed on the floor with the absorbent fabric facing up and the frictional material facing down so that a yoga practitioner can have a comfortable dry contact with the mat, and which will not slip as her body shifts in dynamic yoga transitional motions. Hands and feet can be inserted into the loop holes to provide support when certain difficult positions are required in a yoga exercise sequence.

Fabric Sheets

Sheets of flexible fabric material can provide, e.g., the fabric sheet component of a yoga strap and/or the base fabric for a yoga mat of the invention. The sheets can provide, e.g., strength, moisture absorbency, cushioning, a comfortable texture, a bundled fabric grip, positioning indicia, a defined yoga practice floor space, and/or loop holes for positional support.

Fabric sheets of the invention can be fabricated from any suitable material, that is preferably moisture absorbent. Exemplary fabrics can include materials such as terry cloth, chamois, synthetic chamois, hydrophilic fibers, fibers with a hydrophilic coating, microfibers, nanofibers, a combination of absorbent and nonabsorbent fibers, plant fibers, cellulose, polyester, hemp, cotton, and/or the like. Base fabrics for the fabric sheets can include, e.g., terry cloth, wool, flannel, microfiber fabric, paper, and/or the like. The fabric can be, e.g., continuous, non-porous, finely woven, coarsely woven, a network of fibers, matted fibers, or directed strands.

In one embodiment, the fabric sheets include microfibers (having a dimension in the range from about 1000 μm to 0.1 μm) or nanofibers (having a dimension in the range from about 1000 nm to about 1 nm). The nanofibers or microfibers can have a large surface to volume ratio for an increased ability to adsorb or absorb water. The nanofibers or microfibers can have a rough or porous surface to increase water absorbency. The nanofibers or microfibers can have a hydrophilic surface to increase water absorbency. The nanofibers or microfibers can interact with frictional material, e.g., by covalent linkage chemistries, hydrophobic bonding, and the like, so that the frictional material can be disposed on the fabric sheet with bonding at a molecular level. Optionally, the frictional material can be in the form of a fiber disposed on the fabric sheet interwoven with the absorbent fibers.

The fabric sheets can have dimensions appropriate to the particular yoga device and type of yoga practice. For example, a fabric sheet can have a width ranging, e.g., from less than about 6 inches to more than about 4 feet, from about 12 inches to about 3 feet, or 18 inches to about 2 feet. A fabric sheet can have a length ranging, e.g., from more than about 8 feet to less than about 2 feet, from about 6 feet to about 3 feet, or from about 5 feet to about 4 feet. In one preferred embodiment, the yoga mat is about 30 inches wide by about 6 feet long (preferred dimensions for use as a yoga practice floor area mat). In another preferred embodiment, the yoga mat is about 12 inches wide and about 3 feet long (in a preferred embodiment for a mini mat or mat attached to a larger mat). In still another preferred embodiment, the fabric sheet enclosed in a yoga strap flexible filament is about 18 inches wide 24 inches long. Yoga mats of the invention are typically based on fabric sheets rectangular in shape but can be, e.g., square, round, oblong, oval, trapezoid, diamond shaped, or the like (although typically capable of lying flat). The dimensions of yoga mats in the invention can be varied, e.g., by folding, by binding or unbinding two or more individual yoga mats from each other; or by one mat or strap capturing another in a constriction loop.

Fabric sheets of the yoga mats and straps can have peripheral edges with specialized structures and functions. For example, the edges can be reinforced for strength and resistance to tearing. The reinforcement can be provided, e.g., by stitching, hemming, application of polymers, heat fusion of fibers, and/or the like. A fabric sheet peripheral edge can reinforced by incorporation of a flexible filament into the edge, e.g., by sewing the filament onto the edge or into a hem of the edge. The edge can incorporate frictional materials to reduce slippage. The edge can be stiffer than the main body of the sheet to help provide a well defined and unwrinkled conformation to the fabric sheet.

Fabric sheets can be woven or perforated to provide loop holes useful in the practice of certain yoga positions. The loop holes can have an inner circumference the size of a finger hole, or preferably about 6 inches or more. The loop holes can have reinforcement, similar to that described above for reinforcement of edges, e.g., to provide a three dimensional contact surface, and/or to prevent tearing of the fabric sheet under stresses found in the practice of yoga.

Frictional Material

Frictional materials of the invention can be disposed on one side, both sides, and/or on edges of the fabric sheet. The frictional materials can add toughness to the fabric sheet, prevent slipping between the sheet and the floor, prevent slipping between the yoga practitioner and the yoga mat or strap, provide an ornamental design matrix, provide cushioning, provide absorption of moisture, and/or prevent transfer of moisture through the sheet.

Frictional materials can include, e.g., natural rubber, synthetic rubbers, composite materials, silicone rubber, plastics, cork, resilient polymers, and/or the like. Frictional materials typically provide higher levels of friction between contact surfaces and the yoga mat or strap, than the friction provided by the base fabric sheet material. For example, preferred frictional materials can have a coefficient of static friction or kinetic friction greater than about 0.5, 0.6, about 0.7, about 0.8, or more, in contact with typical surfaces experienced in yoga practice, such as, e.g., wood, tile, plastic, or fabric flooring.

The frictional materials can have, e.g., an open or closed matrix. For example, the frictional material can be a closed impermeable layer or a porous network. The frictional material can be, e.g., an open cell or closed cell foam. The characteristics of the frictional material can be selected to complement the fabric sheet onto which it is disposed. In one embodiment, the frictional material is a continuous closed sheet that can seal off the yoga practitioner from the practice floor. This embodiment can be well suited to situations, e.g., where it is desirable to protect the flooring material from sweat or to prevent moisture from moving up out of the ground when the practitioner exercises outdoors. In another embodiment, the frictional material is an open cell hydrophilic polymer foam. This embodiment can be desirable, e.g., to aid in the collection of sweat and to provide cushioning when practicing on a hard floor. The frictional material can be hydrophilic (water absorbent or water attractive), e.g., to absorb fluids, or hydrophobic (water repellent), e.g., to seal or redirect fluids from a surface.

Frictional materials can be disposed on (into and/or onto) moisture absorbent fabric sheets by a variety of methods known in the art. For example, the frictional material can be a layer bonded to the fabric sheet by stitching, adhesion, polymerization, heat bonding, and the like. The frictional material can be, e.g., a fibrous material and/or network woven among fibers of the moisture absorbent fabric sheet. The frictional material can be applied as a liquid or semisolid composition that hardens to bond after application. For example, the frictional material can be a molten or polymerizing material for application and binding to a fabric sheet side by spreading, spraying, brushing, dipping, and/or the like.

Frictional materials can be disposed on a first (e.g., top) side, a second (e.g., bottom) side, or on both sides of the fabric sheet. In one embodiment, the frictional material is disposed substantially onto the entire bottom side to the yoga mat fabric sheet. A substantially continuous covering of frictional material over the bottom side can provide, e.g., stiffness to the mat, a full friction (non-slip) surface, a full cushion surface, a sealing surface, an insulating surface, and/or the like. Optionally, the frictional material can be disposed discontinuously on a side of the fabric sheet. In one embodiment, the frictional material is disposed on the bottom side in a discontinuous layer that can provide, e.g., a coarse non-slip surface, allowing for fabric sheet breathing, a desirable texture that can be felt by the practitioner through the sheet, a functional or ornamental pattern, and/or the like. In another embodiment, frictional material is disposed on the top side (e.g., the side of the mat normally facing up when in use) of the fabric sheet. For example, a soft, hydrophilic frictional material composition can be disposed in a pattern on the top side, e.g., to provide cushioning, absorb sweat, provide an ornamental pattern, provide an instructional pattern, provide a frictional surface or texture, and/or the like. In still another embodiment, frictional material is disposed on both sides of the fabric sheet. For example, the bottom side can be substantially covered with a tough high friction frictional material, and the top side can be discontinuously covered with a softer absorbent frictional material in a geometric or instructional pattern. The bottom (second) side can have frictional material disposed over about 10% to about 100% of the surface, about 20% to about 80% of the surface, about 30% to about 70%, or about 60% of the surface; with a preferred coverage of from about 60% to about 100% of the bottom side surface. The top (first) side of the fabric sheet can have frictional material disposed over about 100% to about 0% of the surface, about 60% to about 5% of the surface, or from about 30% to about 10% of the surface; with a preferred coverage from about 30% to about 0% of the top surface.

The frictional material can have an appropriate thickness to provide desired properties. For example, the frictional material can be disposed in a thinner amount to provide for lightness, lower expense, greater flexibility, and the like. Frictional material can be disposed in a thicker amount to provide, e.g., more cushioning, more insulation, more stiffness, courser textures, and the like. Frictional materials can be disposed on (into and/or onto) one or more side of the absorbent fabric sheet to a thickness ranging from less than about 0.1 mil to more than about 1 cm, from about 1 mil to about 5 mm, or about 1 mm.

Patterns

Ornamental and/or functional patterns can be provided on one or both sides of the fabric sheet. The patterns can provide, e.g., functional indicia for the yoga practitioner, functional textures, uniform dispersal of frictional material, attractive designs, and/or the like.

Frictional material can be disposed on the top side of the yoga mat absorbent fabric sheet in an ornamental pattern or design. For example, the frictional material can be applied in pleasing geometric patterns, such as arrays of dots or crosshatches, or, e.g., silk screened in scenes appropriate to meditation.

Frictional material can be disposed to provide functional properties to the yoga mat or strap. For example, frictional material can be applied in patterns of human forms in typical yoga practice positions. In one embodiment, frictional materials are disposed on the top side in parallel lines, and in lines meeting at angles, that can be seen and felt by the practitioner to provide a frame of reference for proper body alignment and accurately directed dynamic motions. In other embodiments, the frictional material is disposed, e.g., in dotted, lined, or cross-hatched patterns conducive to hand and feet gripping during exercises. In addition to patterned disposition of frictional material on the top or bottom side, the surface of the frictional material itself can be textured to provide, e.g., ornamentation and/or enhanced non-slip function.

Loop Extensions and Loop Holes

Yoga mats and straps of the invention can include loop holes in the fabric sheet. Yoga straps include loops of flexible filament extending from the peripheral edge of the sheet. These loops and holes can provide a supporting interaction between the yoga mat or strap and one or more yoga practitioners. Loop holes can provide, e.g., hand grips, support rungs, and/or holes for constrictable loops to allow support of appendages during practice of certain yoga positions, and in stretching muscle groups. Loop holes can be provided at any position through the fabric sheet but loop holes near the peripheral edge are preferred. A filament extension loop can provide, e.g., a hand grip and/or a loop for establishing a constrictable loop (similar to a snare or noose) to allow support of appendages during practice of certain yoga positions, and in stretching muscle groups Loop holes in yoga mats of the invention are typically perforations in the fabric sheet at opposing positions adjacent to the peripheral edge. For example, as shown in FIGS. 1A, 1B, 2A and 2B, loop holes 10 can be, e.g., oval perforations at opposite ends of yoga mat 11 long axis 12. The internal circumferences can measure less than 4 inches, or more than about 4 inches, 6 inches, 12 inches, or more, as required to allow passage of a hand, arm, foot, leg, for support. The loop hole internal circumference edge 13 can have reinforcement, as described for the sheet peripheral edge above. The reinforcement can be thickened parallel to the plane of the sheet to increase the surface for application of force and to provide comfort. Optionally, additional loop holes can be positioned between the opposing loop holes to provide alternative loop hole support.

Figure 2A:
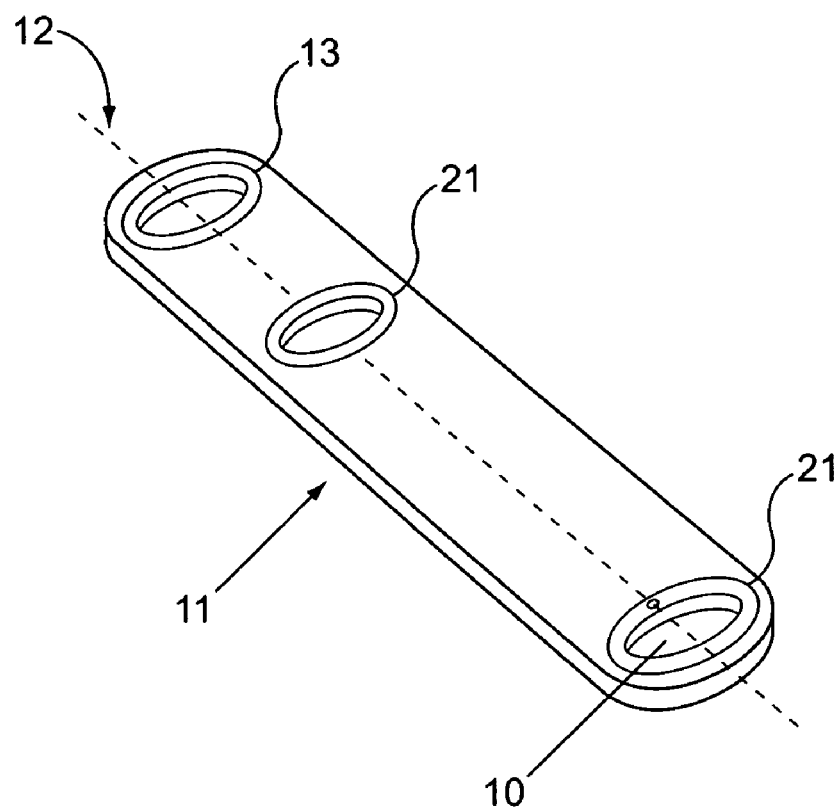
FIG. 2A is a schematic diagram of an exemplary composite yoga mat having loop holes and FIG. 2B is a schematic diagram of the mat configured to provide a constrictable loop.
Figure 2B:
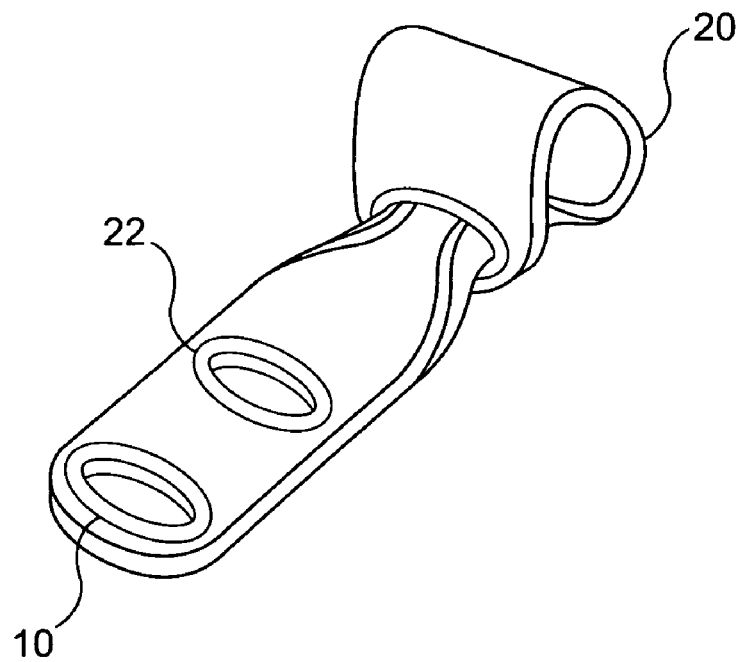

Loop holes can be used to provide variable size constrictable loops, e.g., to accommodate support of appendages, to mount a mat on a wall rail, or to form a convenient carrier structure. One or more sections of fabric sheet peripheral edge can be inserted through one or more loop holes and pulled to form one or more constrictable loops. As shown in FIG. 2B, for example, the opposite end of the yoga mat can be pulled through a loop hole to form constrictable loop 20. The size of the constrictable loop can be adjustable by pulling more or less of the mat through the loop hole, as is well appreciated by those skilled in the art. Optionally, the size of the loop can be affected by the choice of loop holes (e.g., an intermediate loop hole 22) through which the mat end is pulled through. The constrictable loops allow for a firm grip on practitioner body parts or secure mounting to support hardware, such as a hand rail or post. The constrictable loop, or entire mat, can wrap around a practitioner's torso or waist to provide a hand grip, e.g., for support from a yoga instructor during lessons.

Loop holes in yoga mats of the invention are typically perforations in the fabric sheet at opposing positions adjacent to the peripheral edge. For example, as shown in FIGS. 1A, 1B, 2A and 2B, loop holes 10 can be, e.g., oval perforations at opposite ends of yoga mat 11 long axis 12. The internal circumferences can measure less than 4 inches, or more than about 4 inches, 6 inches, 12 inches, or more, as required to allow passage of a hand, arm, foot, or leg, for support. The loop hole internal circumference edge 13 can have reinforcement, as described for the sheet peripheral edge above. The reinforcement can be thickened parallel to the plane of the sheet to increase the surface for application of force and to provide comfort. Optionally, additional loop holes can be positioned between the opposing loop holes to provide alternative loop hole support options.

Filament extension loops of yoga straps can be used as grips or support loops, or can be used to form into variable size constrictable loops, e.g., to accommodate support of appendages, mounting to rails, or connection to other yoga straps. For example, one loop extension can be run through another loop or loop hole to form a constrictable loop. The presence of the fabric sheet can help hold the sides of the flexible filament stay close together and provide a broad cushioned contact surface for anything placed within the constriction. The size of the constrictable loop can be adjustable by pulling more or less of the mat through the loop hole, as is well appreciated by those skilled in the art. The constrictable loops allow for a firm grip on practitioner body parts or secure mounting to support hardware, such as a hand rail or post. The constrictable loop, or substantially the entire yoga strap, can wrap around a practitioner's torso or waist to provide a hand grip, e.g., for support from a yoga instructor during lessons. The constrictable loop can be used to capture other yoga equipment, such as a yoga mat, for carrying or storage. The fabric sheet can form a compartment so that even small objects can be carried without falling out.

In preferred embodiments of yoga straps the fabric sheet has a length greater than the average length of the filament in a loop extension of the yoga strap. In more preferred embodiments, the yoga strap of the invention has a flat flexible substantially rectangular fabric sheet, wherein the length of the long edge is greater than the length of the filament in the extension loop.

Connectors

Connectors can be provided on yoga mats of the invention, e.g., to stabilize desirable mat and strap configurations. For example connectors can be used to hold a yoga mat or strap in a rolled configuration for transport and storage. Connectors can bind multiple yoga mats or straps together. Connectors can fix a constrictable loop at a desired position, such as at a desired loop size. Connectors can be used to attach a composite yoga mat to the exercise floor, to tatami mats, to traditional mats, or other commonly available mats.

Yoga mats or straps can be rolled up for easy and compact handling. The outer end of the roll can have one or more connectors to prevent unrolling. The connectors can be, e.g., string for tying around the roll, hook and loop (Velcro®) connectors, snaps, zippers, buckles, pins, clips, straps, buttons, and/or the like. Optionally, rolled yoga mats can be retained in a carry bag.

Figure 3:
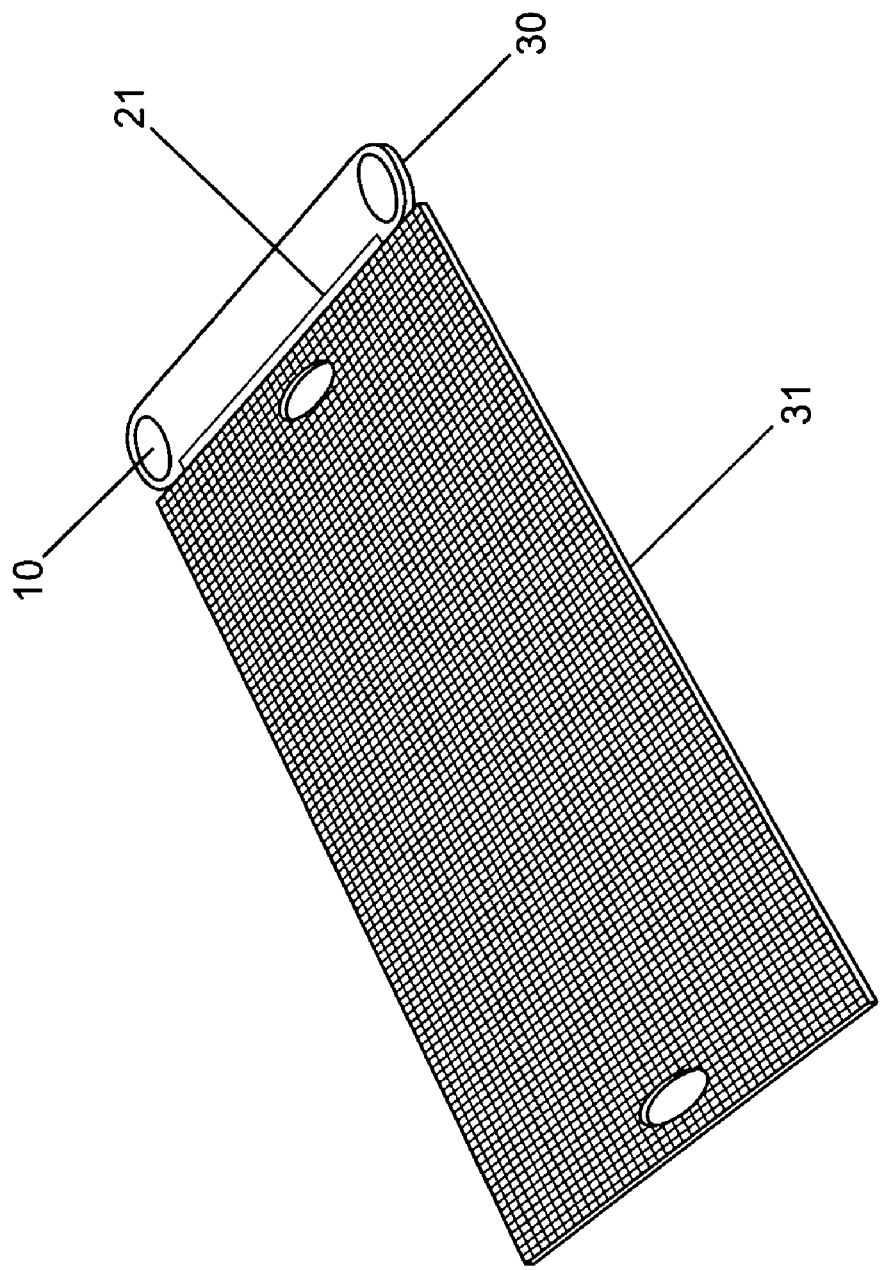
FIG. 3 is a schematic diagram of two yoga mats bound together with a connector to form a larger mat.

Two or more yoga mats or straps can be bound together to provide a thicker mat or larger area mat surface. In one embodiment, as shown for example in FIG. 3, small yoga mat (or, optionally a yoga strap) 30 of the invention, with loop holes 10, is releasably bound to larger yoga mat 31 of the invention using, e.g., hook and loop strips. The small mat can alternately be used to thicken cushioning at one end of the mat (in a pillow like configuration), expand the surface of the overall mat, or be removed from the larger mat for use in loop support practices described above. Yoga mats of the invention can be bound together, typically, at the peripheral edges. Connectors 21 for binding multiple yoga mats can include, e.g., zippers, hook and loop (Velcro®) connectors, snaps, laces, buckles, pins, clips, buttons, and/or the like. In preferred embodiments, the yoga mats and yoga straps of the invention are not attached to a larger mat or fabric sheet; or, if present, the attached mat of sheet is removable (detachable), e.g., by unzipping, unlacing or tearing a loop and hook fastener.

Composite yoga mats can have connectors to attach them to the floor or other mats. Such attachment can further stabilize the yoga mat against slippage. Attachment to non-portable mats can provide the benefits heavy mats that may be available at a yoga practice location, while also providing the unique benefits of the portable composite yoga mats. Attachment of composite yoga mats to the floor or other mats can provide, e.g., additional cushioning, a personal yoga practice surface, a more stable surface, and moisture absorbency. Yoga mats of the invention can be attached to the floor by connectors such as, e.g., clips, loop and hook connectors, hooks, snaps, and/or the like. Yoga mats of the invention can be attached to other mats using connectors, such as, e.g., zippers, hook and loop (Velcro®) connectors, snaps, laces, straps, buckles, pins, clips, buttons, and/or the like, as described for connection of two or more yoga mats. In a preferred embodiment, a yoga mat is be attached to other mats by providing a pocket of fabric along the periphery of the mat so that it can be fitted over one or more end, or corner, of the other mat in a fashion similar to putting a fitted sheet on a mattress.

Connectors can be used to stabilize constrictable loops at a desired size. Under high forces or loads, constrictable loops can constrict to apply excessive pressures on practitioners. This can be controlled by mounting suitable connectors, e.g., at points where the body of the yoga mat slides through a loop hole (or where fabric sheet slides through a filament extension loop). For example, hook and loop connectors can be stitched with the loop material at the internal circumference of the loop hole and with the hook material extending along the second side of the fabric sheet, thereby allowing selection of fixing points where the mat body contacts the loop. Other connectors to stabilize constrictable loops include, e.g., laces, hooks, zippers, snaps, buttons, and the like.

Use of Yoga Mats and Yoga Straps

Yoga mats and straps can provide combinations of characteristics useful and specialized to aid in the practice of yoga. Yoga mats and straps of the invention are well adapted to functionally support practitioners in the learning and practice of yoga positions and meditation. Yoga mats of the invention can provide, e.g., combinations of cushioning, orientation, indicia, stability, limb support, insulation, removal of sweat, and traction, uniquely adapted to aiding the practice of yoga. Yoga straps can provide, e.g., combinations of cushioning, support, and packaging.

In one embodiment, yoga mats or straps of the invention can be used to stretch a practitioner's muscles and go through joint range of motion before or after a yoga session. For example, the practitioner can flex the knee joint and stretch the quadriceps by inserting a foot through a loop hole (or filament extension loop) to the ankle, then grasping and pulling the other end of the mat with her hands from behind her back. The same yoga mat or strap can then, e.g., be used to wipe sweat from the practitioner, be attached to a larger mat to provide additional practice area, form a yoga equipment carrier, and/or provide other yoga related functions described herein.

In an aspect of the invention, yoga mats with loops or loop holes can be used to improve flexibility while learning certain positions. For example, while progressing in the practice of positions, such as utthita hasta padangustasana, the standing hand-big-toe-posture, a practitioner can support the raised leg in a loop while grasping the fabric sheet with the raised arm. As the practitioner increases in flexibility, the practitioner can grasp the fabric sheet ever closer to the loop until the position can be practiced without aid of the yoga mat or strap. Optionally, yoga straps or yoga mats with loops can be used to support elevated appendages until muscle strength is acquired allowing practice of certain positions without additional support. For example, in the uttana padasana position both the legs and arms are extended and lifted up at an angle with the practitioner on her back. While learning the uttana padasana, and acquiring the necessary strength, the practitioner can provide support from her hands to feet inserted in loop holes.

Yoga mats and straps of the invention can optionally be used to provide a stable surface for the practice of yoga positions and movements (in addition to other functions described herein). Frictional material on one or both fabric sheet sides can prevent slippage on the floor and/or slippage of the practitioner on the sheet. The moisture absorbency of the fabric sheets can further reduce slippage of mats and practitioners by preventing accumulation of moisture between the frictional material and the practitioner or floor. This characteristic can be particularly beneficial in the practice of bikram yoga where the room temperature is elevated.

The moisture absorbent aspect of yoga mats of the present invention can be highly desirable in the practice of yoga. As mentioned previously, removal of moisture can prevent slippage. In addition, removal of excess moisture can provide a more comfortable, less "clammy" contact with the skin of the practitioner. In one aspect, the yoga mats or fabric sheets of yoga straps can be used as a towel to wipe sweat from the practitioner and to clean up the practice area after exercises are completed.

Indicia can be imprinted onto the top side of the fabric sheet to provide unique functional information to aid the practitioner in the practice of yoga. For example, the top side can be imprinted with silhouettes of the astanga yoga primary series of positions to provide the practitioner with sequence and positioning cues. In another example, lines and/or geometric patterns can be imprinted onto the top side to provide references and alignment cues to the practitioner, e.g., to indicate the proper back alignment, limit of trunk rotation, or proper positions for foot placement in particular positions or as directed by the yoga instructor.

EXAMPLES

The following examples are offered to illustrate, but not to limit the claimed invention.

Example 1

Yoga Mat with Frictional Material on Both Sides

Figure 1A:
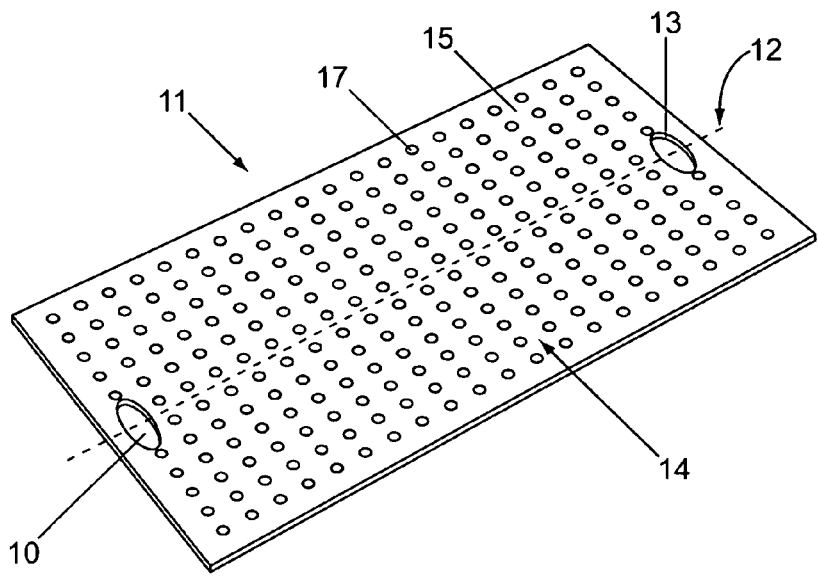
FIGS. 1A and 1B are schematic diagrams of an exemplary composite yoga mat having loop holes and frictional material disposed on both sides of the mat.
Figure 1B:
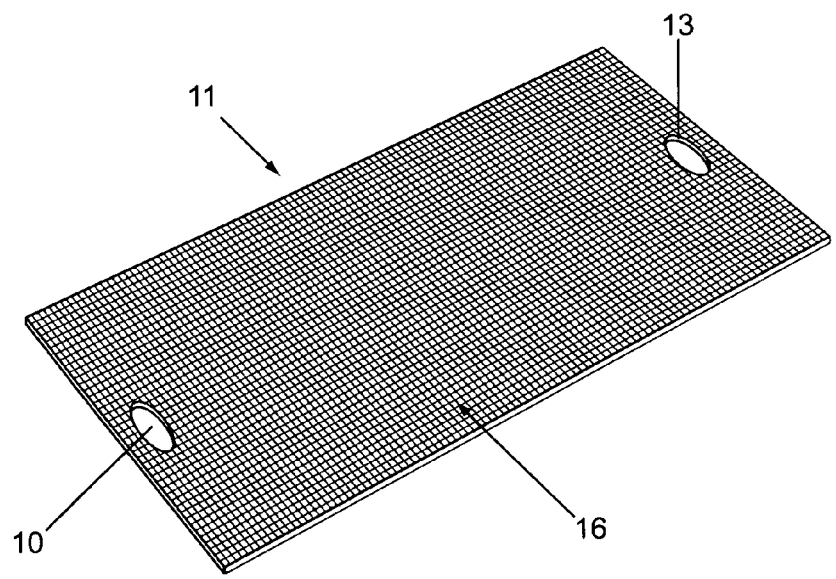

A yoga mat can be fabricated with frictional material disposed on both sides of the moisture absorbent fabric sheet to provide stability and comfort. Imprinted frictional material 17 is arrayed on top (first) side 14 in a pattern of dots to provide a frictional surface and gripable texture to the top side, as shown in FIG. 1A. Moisture absorbent fabric 15, exposed between and around the frictional material dots, absorbs moisture away from the dots and provides a surface that "breathes" for the comfort of the practitioner. The top side frictional material is foamy, resilient, and hydrophilic. Bottom (second) side 16 is substantially covered with an impermeable layer of frictional material having a grid pattern of linear grooves, as shown in FIG. 1B. The bottom side frictional material layer can prevent transfer of moisture between the practitioner and floor while providing a tough non-slip surface. Such fabrics can also be used in the fabric sheet of a yoga strap.

Figure 4:
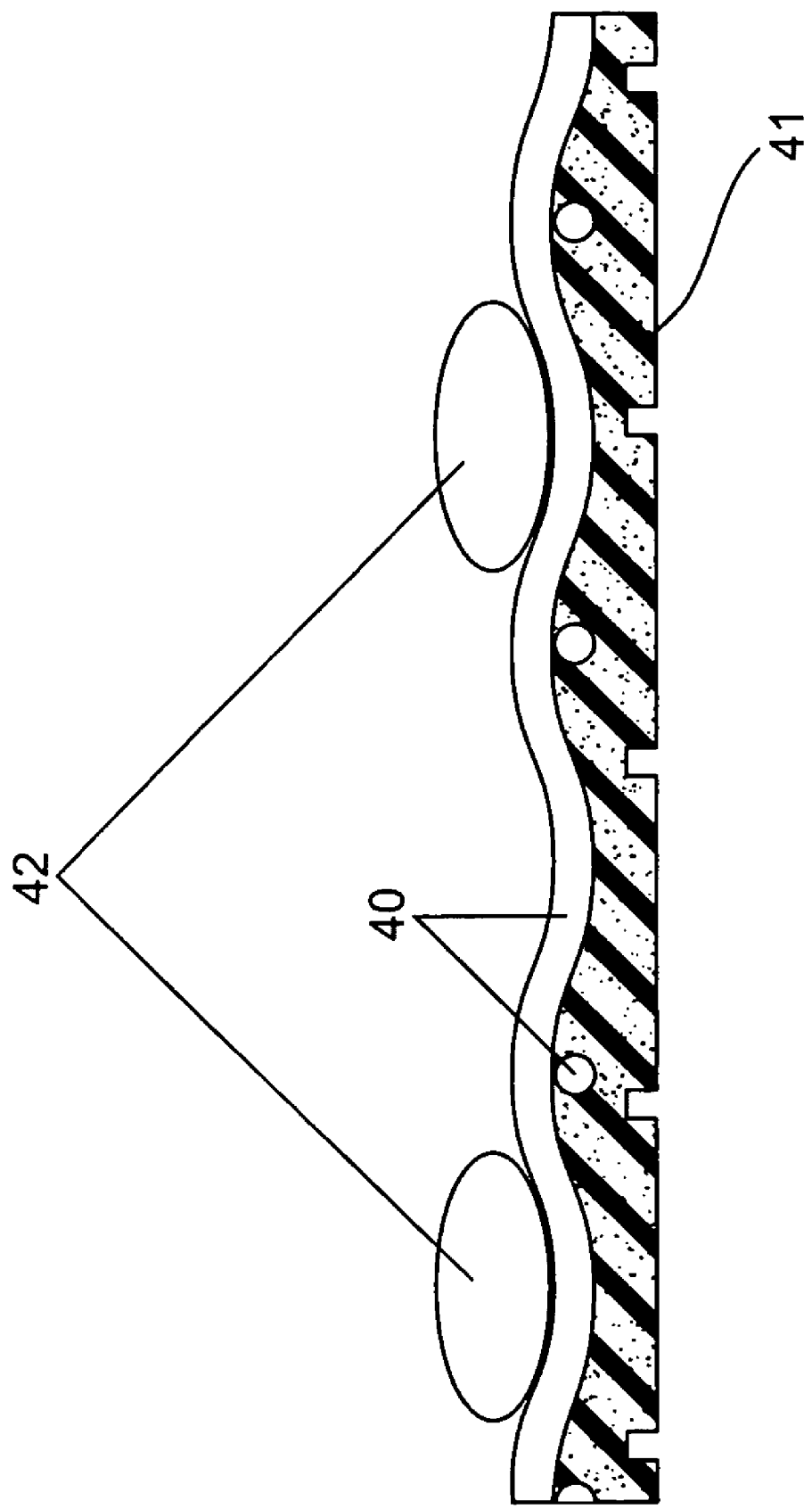
FIG. 4 is a schematic diagram showing a cross-section through an exemplary composite yoga mat fabric sheet.

FIG. 4 shows a schematic diagram of a cross section taken through the mat of FIG. 1. The yoga mat is constructed as a composite of moisture absorbent fabric sheet material 40 with tough impermeable closed matrix frictional material 41 embedded into the bottom side of the fabric sheet and a softer hydrophilic closed cell foam frictional material 42 embedded in a dot pattern on the top side of the fabric sheet.

Example 2

Fabric Yoga Strap

A yoga strap was manufactured with a flexible filament and a fabric sheet having structures appropriate to function in providing the multiple benefits of the invention. Although straps and mats are known in the yoga art to be useful for certain functions, the combination of the strap and fabric sheet provides benefits not present in the independent structures.

An 80 inch long by 1.5 inch wide flat cotton strap was formed into a loop by sewing together the two ends two cut ends of the strap material. A 19-inch by 25-inch microfiber towel was prepared with the 4 peripheral edge sides reinforced with thread stitching. 1.5-inches of a first long peripheral edge (25-inch side) was folded over to form a hem and capturing a length of the cotton strap. The strap was attached to the fabric sheet by stitching through the hem fold layers of the sheet together with the captured strap material. This was repeated on the opposite second long peripheral edge section to capture and attach, in a symmetrical fashion, an opposite length of the strap. This process left about 15 inches of cotton strap extending as a loop from corners at each short end of the fabric sheet.

The final fabric yoga strap included a 25-inch by 16-inch fabric sheet including 1.5-inch hems capturing 25 inches of cotton strap along each of the opposite long peripheral edge sections. Loops were formed with 15 inches of cotton strap extending from the fabric sheet at one corner out and across the short edge section to attachment in the hem at the other corner. A similar loop was also formed across the other short peripheral edge at the other end of the fabric sheet. Thus the yoga strap included a 25×16 fabric sheet attached to a cotton strap along the 25 inch peripheral edge sections but not attached to the 16 inch peripheral edge sections (but for where the straps extend from the corners). The internal circumference (loop internal circumference) of the extension loops was 28 inches (13 inches of short peripheral edge and 15 inches of extended cotton strap material).

When a yoga practitioner's foot arch is placed onto one loop extension cotton strap and the practitioner pulls on the other extension loop, the tension results in the long fabric sheet peripheral edges coming close together (e.g., at a distance about the width of the foot arch) so that the fabric sheet material is bundled or pleated between the filament sections. If the practitioner wants to grip the strap at a position closer to the foot, a comfortable and sure hand grip is available in the region of the bundled fabric. So, the yoga strap provides a strong and comfortable way for one appendage to support another. Support can be from infinitely variable distances, e.g., depending on where the practitioner chooses to grip the yoga strap.

It is understood that the examples and embodiments described herein are for illustrative purposes only and that various modifications or changes in light thereof will be suggested to persons skilled in the art and are to be included within the spirit and purview of this application and scope of the appended claims.

While the foregoing invention has been described in some detail for purposes of clarity and understanding, it will be clear to one skilled in the art from a reading of this disclosure that various changes in form and detail can be made without departing from the true scope of the invention. For example, many of the features and aspects of the yoga mats described above can be used in various combinations.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A yoga strap for aiding a practitioner of yoga in a variety of yoga positions, the strap comprising:
   a fabric sheet comprising a peripheral edge, which comprises a first pair of opposite peripheral edge sections, a second pair of opposite peripheral edge sections between the first pair, a first face, and a second face; and,
   a flexible filament attached to the first pair of peripheral edges at positions separated by the second pair of opposite peripheral edges, and forming a first loop extending beyond a first of the second peripheral edges and the flexible filament forming a second loop extending beyond a second of the second peripheral edges.

2. The yoga strap of claim 1, wherein the fabric sheet comprises: terry cloth, chamois, synthetic chamois, fibers with a hydrophilic coating, a combination of absorbent and nonabsorbent fibers, plant fibers, or cotton.

3. The yoga strap of claim 1, wherein the fabric sheet comprises a width less than about 18 inches and a length less than about 3 feet thereby providing a structure with dimensions functional as a yoga strap.

4. The yoga strap of claim 3, wherein the fabric sheet comprises a length and width more than 12 inches and the flexible filament is not substantially elastic.

5. The yoga strap of claim 1, wherein the fabric sheet can be laid out flat with the peripheral edges extended outward in a plane without substantial amounts of excess loose material outside the plane of the edges.

6. The yoga strap of claim 1, wherein the yoga strap is without a larger fabric sheet attached to any of the peripheral edges.

7. The yoga strap of claim 1, wherein extending loops each comprise internal circumferences of more than about 6 inches, thus providing a structure capable of functioning as hand grip.

8. The yoga strap of claim 1, wherein the flexible filament of the extending loops is continuous from the first loop to the second loop.

9. The yoga strap of claim 1, further comprising one or more yoga mats removably attached to a peripheral edge of the yoga strap.

10. The yoga strap of claim 1, wherein the flexible filament has a tensile strength adequate to hold 150 pounds or more without breaking, thus having the structure to function in support of a yoga practitioner in the practice of a variety of yoga exercises.

11. The yoga strap of claim 1, wrapped around a rolled up yoga mat.

12. A method of practicing yoga positions with support from the yoga strap of claim 1, wherein the position support is selected from the group consisting of: supporting a yoga practitioner standing on the strap; supporting a practitioner standing in the hand-big-toe-posture with a raised leg in a loop hole of the strap while grasping the body of the mat with the raised arm; supporting a practitioner in the uttana padasana position by inserting hands and feet into loop holes of the strap; and supporting a leg by inserting an ankle through a loop hole then grasping and pulling an opposite end of the strap with a practitioner's hand from behind a back of the practitioner.

13. A yoga mat comprising:
   a fabric sheet comprising a first face, a second face, and a peripheral edge; and, two or more opposing loop holes adjacent and internal to the peripheral edge, the loop holes comprising an internal circumference of more than about 6 inches;
   whereby a variety of yoga positions can be practiced by insertion of yoga practitioner body appendages into the loop holes or constrictable loops formed therefrom.

14. The yoga mat of claim 13, wherein the fabric sheet comprises a moisture absorbent material selected from the group consisting of: terry cloth, chamois, synthetic chamois, hydrophilic fibers, fibers with a hydrophilic coating, a combination of absorbent and nonabsorbent fibers, plant fibers, cellulose, polyester, hemp, and cotton.

15. The yoga mat of claim 13, wherein the fabric sheet comprises a length more than about 3 feet and a width about 18 inches or less.

16. The yoga mat of claim 13, further comprising a frictional material disposed on the fabric sheet second face.

17. The yoga mat of claim 16, wherein the frictional material comprises: a rubber, a foam rubber, a resilient polymer, a polyvinyl foam, a sponge, cork, or silicone rubber.

18. The yoga mat of claim 13, wherein the peripheral edge or loop hole internal circumferences comprise reinforcing material.

19. The yoga mat of claim 13, further comprising one or more connectors to: maintain rolled configuration, bind two or more mats together, or to fix a constrictable loop in a desired position.

20. The yoga mat of claim 13, further comprising one or more intermediate loop holes in the fabric between the two or more opposing loop holes.

* * * * *